(12) United States Patent
Edington et al.

(10) Patent No.: US 10,184,412 B2
(45) Date of Patent: Jan. 22, 2019

(54) IMPROVEMENTS TO ENGINE SHUTDOWN AND RESTART

(71) Applicant: JAGUAR LAND ROVER LIMITED, Warwickshire (GB)

(72) Inventors: Ian Edington, Coventry (GB); Adam Moorcroft, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 178 days.

(21) Appl. No.: 15/102,570

(22) PCT Filed: Dec. 18, 2014

(86) PCT No.: PCT/EP2014/078519
§ 371 (c)(1),
(2) Date: Jun. 8, 2016

(87) PCT Pub. No.: WO2015/091835
PCT Pub. Date: Jun. 25, 2015

(65) Prior Publication Data
US 2016/0312725 A1  Oct. 27, 2016

(30) Foreign Application Priority Data
Dec. 19, 2013 (GB) .................................. 1322591.7

(51) Int. Cl.
*F02D 41/04* (2006.01)
*F02D 19/00* (2006.01)
(Continued)

(52) U.S. Cl.
CPC .............. *F02D 41/065* (2013.01); *F01L 1/24* (2013.01); *F02D 13/0226* (2013.01);
(Continued)

(58) Field of Classification Search
CPC .............. F02D 41/0002; F02D 41/042; F02D 13/0226; F02D 2041/001; F02D 2041/002;
(Continued)

(56) References Cited

U.S. PATENT DOCUMENTS 9,097,200 B2 * 8/2015 Yamauchi ........... F02D 41/0005
2003/0106515 A1  6/2003 Kondo
(Continued)

FOREIGN PATENT DOCUMENTS

FR  2965303 A1  3/2012
GB  2431733 A  5/2007
(Continued)

OTHER PUBLICATIONS

Combined Search and Examination Report under Sections 17 and 18(3) for Application No. GB1322591.7 dated Jul. 25, 2014.
(Continued)

*Primary Examiner* — Hieu T Vo
*Assistant Examiner* — Arnold Castro
(74) *Attorney, Agent, or Firm* — Carlson, Gaskey & Olds

(57) ABSTRACT

Aspects of the present invention relate to methods of stop/start of an internal combustion engine provided with a CVVL system; also a control unit and a vehicle for employing the methods.

20 Claims, 7 Drawing Sheets

(51) Int. Cl.
*F02D 9/02* (2006.01)
*F02D 41/06* (2006.01)
*F02D 13/02* (2006.01)
*F02D 13/08* (2006.01)
*F02N 11/08* (2006.01)
*F01L 1/24* (2006.01)
*F02D 41/30* (2006.01)
*F02D 41/00* (2006.01)
*F02N 19/00* (2010.01)

(52) U.S. Cl.
CPC ......... *F02D 13/08* (2013.01); *F02D 41/0002* (2013.01); *F02D 41/042* (2013.01); *F02D 41/3005* (2013.01); *F02N 11/0844* (2013.01); *F02D 2009/0245* (2013.01); *F02D 2041/001* (2013.01); *F02D 2041/002* (2013.01); *F02D 2041/0095* (2013.01); *F02N 2019/008* (2013.01); *Y02T 10/18* (2013.01); *Y02T 10/42* (2013.01); *Y02T 10/48* (2013.01)

(58) Field of Classification Search
CPC ..... F02D 2041/0095; F02D 2009/0245; Y02T 10/18; Y02T 10/42; Y02T 10/48
USPC ............................................ 123/179.3, 179.4
See application file for complete search history.

(56) References Cited

U.S. PATENT DOCUMENTS

| | | |
|---|---|---|
| 2003/0172890 A1 | 9/2003 | Vattaneo et al. |
| 2004/0123831 A1 | 7/2004 | Grieser et al. |
| 2005/0109302 A1* | 5/2005 | Tetsuno ................ F02D 41/042 123/179.5 |
| 2006/0124090 A1 | 6/2006 | Hirose et al. |
| 2007/0233357 A1* | 10/2007 | Sugai ....................... B60K 6/48 701/105 |
| 2007/0261668 A1 | 11/2007 | Kataoka et al. |
| 2009/0070020 A1* | 3/2009 | Tetsuno ................ F02D 35/026 701/113 |
| 2010/0114462 A1 | 5/2010 | Gibson et al. |
| 2010/0313837 A1 | 12/2010 | Fujioka |
| 2012/0006291 A1 | 1/2012 | Nishikiori et al. |
| 2013/0080036 A1 | 3/2013 | Yamauchi et al. |
| 2013/0080039 A1* | 3/2013 | Nakamoto ............ F02D 41/009 701/113 |
| 2013/0110383 A1 | 5/2013 | McDonald |
| 2013/0166177 A1 | 6/2013 | Calva et al. |
| 2015/0025780 A1 | 1/2015 | Gibson et al. |
| 2016/0076472 A1* | 3/2016 | Nakamoto ................ F02B 1/12 123/299 |

FOREIGN PATENT DOCUMENTS

| | | |
|---|---|---|
| JP | 2004169646 A | 6/2004 |
| JP | 2006052695 A | 2/2006 |
| JP | 2010185312 A | 8/2010 |
| JP | 2013113160 A | 6/2013 |

OTHER PUBLICATIONS

International Search Report and Written Opinion of the International Searching Authority for International application No. PCT/EP2014/078519 dated May 15, 2015.
Combined Search and Examination Report under Sections 17 and 18(3) for Application No. GB1422601.3 dated Jun. 19, 2015.
EPO Communication pursuant to Rule 164(2)(b) and Article 94(3) EPC, for Application No. 14 814 889.3 dated Apr. 4, 2018.

* cited by examiner

IMPROVEMENTS TO ENGINE SHUTDOWN AND RESTART

TECHNICAL FIELD

The present disclosure is concerned with improvements to engine shut down and restart. Embodiments of the invention relate to a method of optimising a stop/start functionality for a vehicle with an internal combustion engine, a controller for implementing the method, and a vehicle equipped with such a controller.

BACKGROUND OF THE INVENTION

It is known to provide a vehicle comprising a four stroke internal combustion engine with a 'stop/start' functionality. By this is meant that for reasons of fuel efficiency and reducing undesirable emissions, whilst a vehicle may for example be stationary and the running of an ICE/engine of the vehicle is unnecessary, the engine may be automatically stopped provided certain conditions are met. Often, conditions for such stopping include the vehicle being stationary and a brake system being applied by a driver. This equates to the 'stop' part of the functionality. Allied to this is a 'start' functionality whereby the engine of the vehicle is automatically restarted upon a change to various conditions, such as release of a brake system by a driver of the vehicle, or a requirement to generate torque in order to produce power for another system of the vehicle, such as an air conditioning system. Such systems, and the various means by which stop/start events are triggered by various conditions, are known, and are not discussed further in this application.

Often a 'stop/start' event will occur at a given point during a journey such as a momentary cessation of vehicle movement at, for example, a set of traffic lights, or in heavy traffic conditions where a vehicle may progress for a short distance and then stop for a few seconds, then progress a further short distance. In such circumstances, and given the relatively short period of time between an 'engine stop' command and a subsequent 'engine restart' command associated with such conditional uses of the stop/start system, it is a preferential attribute of the engine in conjunction with the stop/start system that the engine is able to shut down and restart in as expeditious a manner as possible. This then maximises the amount of time during which the engine is stopped, which in turn maximises the zero fuel use period of the engine, thus maximising the benefit of the system with regards to emissions reduction.

Achieving a smooth and fast stop/start is desirable. However in some circumstances the engine may shake or shudder when stopping, due to large changes in acceleration and deceleration of the crankshaft as rotation ceases; the crankshaft may for example make a small reversal of rotation.

The engine may require to be re-started during a stopping event, in which case such reverse rotation may conflict with rotation of a starter motor and result in pinion clash. For example if such an event occurs at less than 400 rpm, a starter motor delay of 0.4 s may be required to obviate pinion clash; this delay is noticeable, and should be eliminated if possible.

The time to cessation of rotation may also vary according to the stop position of the crankshaft and the in-cylinder pressure(s). Re-start time may be influenced by the air mass in the engine cylinders, and by leakage of in-cylinder pressure from a cylinder on a compression stroke. Restart time may also be influenced by the timing of a fuel injection having regard to crankshaft position, in particular of a cylinder which is close to TDC.

Prior art methods and apparatus have proposed management of throttle position during engine stopping to control the air charge to the cylinders, but these may not be very effective for inlet manifolds having a comparatively large volume. In any event prior solutions tend to be a compromise between engine refinement, restart performance and control of engine emissions.

In one prior art system, an engine is shut down by cutting fuel to the engine and closing the throttle, which controls the amount of air entering the inlet manifold. Another way is to cut the fuel whilst leaving the throttle open. Each of these methods results in differing shutdown characteristics.

A 'closed throttle' shutdown tends to result in an engine shutdown with comparatively good NVH (noise, vibration and harshness) characteristics compared to an 'open throttle' shutdown. One reason for this is that reduced cylinder compression may reduce shutdown shake, which in turn may be influenced by the timing of closing of the throttle, and the respective volume of cylinder and inlet manifold.

Closing the throttle on shutdown allows the engine to continue to rotate before finally stopping, and the valves on the cylinders continue to allow air into the cylinders on their induction stroke. This potentially results in a pressure drop in the inlet manifold. Upon a restart demand on the engine, pressure in the inlet manifold is therefore low, and comparatively low charges of fresh air enter into the engine cylinders until this pressure is regained. This may result in a restart with poor characteristics, such as an undesirably long cranking time before ignition, and a delay in net torque output availability. The time taken for the engine to cease rotation with a closed throttle shutdown may be longer than that when an equivalent 'open throttle' shutdown is made.

With an 'open throttle' shutdown, inlet manifold pressure is maintained or rises as the engine rotates. Relatively high mass charges of fresh air enter the engine cylinders, and an open throttle shutdown may have a different time than a closed throttle shutdown, depending on the pumping loss and compression loss within a particular engine.

An advantage of the open throttle shutdown is that once the engine has come to a halt, at least one cylinder will tend to be charged with a relatively normal full pressure air charge. Also the inlet manifold is still at full pressure. This means that when there is a restart demand, the restart characteristics may be comparatively good—restart time, and time until net torque output availability, may be shorter. The same advantage applies where a restart demand is made prior to the engine ceasing rotation (a so-called change of mind (COM) event), provided that pinion clash is avoided.

However, the open throttle shutdown tends to result in a comparatively poor NVH performance on shutdown. The effect of the induction, compression and expansion of comparatively high air charges in the engine cylinders as the engine is slowing down is that rotation of the crankshaft becomes irregular or 'lumpy', particularly as the engine approaches a final stop. Speed oscillation is large because of the comparatively high forces due to compression of comparatively high air changes in the cylinders. Ultimately the engine may reach a point just prior to stop where the piston in one cylinder has just passed TDC (top dead centre) and has a full compressed air charge, which is acting to continue rotation of the engine, whilst another cylinder has a piston just after BDC (bottom dead centre) and has a full air charge that continued rotation would act to compress and thus resist rotation. At this point the two cylinders act in opposition to each other and this may result in a 'rocking' motion with the crankshaft rotationally 'bouncing' forwards and backwards until rotation ceases. This is felt by a driver as a further engine shake or vibration. In combination with the 'lumpy' irregular crankshaft rotation as the engine slows down, this is an undesirable NVH trait, particularly for higher-end or luxury motor vehicles in which smoothness and quietness are a desirable attribute.

Accordingly it can be seen that in the prior art there is a trade-off to be made between a 'closed throttle' and 'open throttle' shutdown for stop/start purposes, with each option offering advantages over the other but suffering from relative disadvantages.

What is required is a shutdown procedure or method which offers more of the advantages of the prior art methods, so as to give a low-NVH shutdown whilst preferably also allowing for a fast and effective restart, when a vehicle undertakes a stop/start operation.

More recently, engines have come to be equipped with 'variable valve' systems in which active tappets provide for substantially immediate change of operation of an associated valve, independent or at least semi-independent of a camshaft or other valve control device, on a stroke—by—stroke basis. Such an active tappet may include a hydraulic chamber whose volume is controlled by an electrically actuated valve, such as a bleed valve, responsive to a command from an engine ECU. Such a tappet may comprise a solenoid.

Typically such variable valve systems provide for the use of active tappets to vary the size of inlet aperture and/or timing of admission of air into a combustion chamber and the size of exhaust aperture and/or timing of the exhaust of air or combustion gas from the combustion chamber at each stroke of the respective valve. In the prior art this is done typically so as to provide the required charge of air or/and gas in the combustion chamber whilst an engine is running, to provide control of torque and/or to improve the fuel efficiency and/or emissions characteristics of the engine.

In typical standard prior art applications, air charge may be controlled by an active tappet, according to one or more of the following techniques:
  varying valve lift so as to increase or decrease the maximum opening of the poppet valve during an activation cycle. If the opening and closing timing is unchanged, an increased lift will increase the mass of aspirated air, and a reduced lift will reduce the mass of aspirated air (if the valve is within the throttling range).
  varying the duration of valve opening, either by re-timing valve opening, re-timing valve closing, or both. If the valve lift is unchanged, a longer open duration can be used to increase the mass of aspirated air, and a shorter duration can be used to reduce the mass of aspirated air.
  varying the timing overlap of inlet and exhaust valves, by for example re-timing the opening of the inlet valve to increase or reduce overlap with operation of the exhaust valve.

Reduced overlap will tend to increase the mass of air available for combustion, whereas increased overlap will tend to reduce the mass of air available for combustion.

The mass of air available for combustion may be reduced by directly reducing the mass of a fresh air charge, or by controlling valve overlap to retain a greater proportion of combustion gases within a combustion chamber; such gases are inert and cannot contribute towards combustion.

If an active tappet is also provided for an exhaust valve of the combustion chamber, valve overlap may be varied by means of the inlet valve tappet, the exhaust valve tappet, or both.

The apparatus and method of dealing with stopping and starting of an engine during a stop/start event should preferably be applicable to both diesel and gasoline variants, and accordingly should be susceptible of variation to suit the different stopping and starting characteristics thereof.

SUMMARY OF THE INVENTION

Advantageously it has been found that the use of variable valve systems as briefly described above offers the opportunity to improve stop/start functionality of a four stroke internal combustion engine, as herein revealed in relation to embodiments of the invention described.

Aspects of the present invention relate to a method of modulation of a shutdown of an internal combustion engine, a controller, an engine, and a vehicle. By 'shutdown' we mean the period between commanding a cessation of engine operation and ceasing of rotation of the engine.

In an aspect of the invention there is provided a method of ceasing rotation of a four stroke internal combustion engine, comprising:
  ceasing fuel supply;
  controlling the cylinder charge from the engine inlet such that:
    a cylinder predicted to stop on a power stroke has a reduced air charge on the respective inlet stroke, and
    a cylinder predicted to stop on a compression stroke has a comparatively full air charge on the respective inlet stroke.

It will be understood that the respective inlet stroke for each of the cylinders refers to the final inlet stroke for that cylinder before the stroke on which the engine is predicted to stop. Furthermore, it will be understood that the reduced air charge on the respective inlet stroke of a cylinder predicted to stop on a power stroke may be reduced relative to the air charge on the preceding inlet stroke of that cylinder. The air charge on the respective inlet stroke of a cylinder predicted to stop on a compression stroke is comparatively full. For example, it may be increased relative to the air charge in a cylinder predicted to stop on a power stroke. Alternatively or in addition the air charge on the respective inlet stroke of a cylinder predicted to stop on a compression stroke may be substantially equal to or greater than the air charge of the inlet stroke immediately before the respective inlet stroke for the cylinder predicted to stop on a compression stroke.

The cylinder charge may be controlled to provide a comparatively full air charge to a cylinder stopping on an induction stroke.

It will be understood that the air charge on the inlet stroke of a cylinder predicted to stop on an induction stroke is comparatively full. For example, it may be increased relative to the charge on the respective inlet stroke of the cylinder predicted to stop on a power stroke. Alternatively or in addition it may be substantially equal to or greater than the air charge of the inlet stroke immediately before the respective inlet stroke for the cylinder predicted to stop on an induction stroke.

The cylinder charge may be controlled by adjustment of lift and/or duration, and/or opening time and/or closing time of a poppet valve of each respective cylinder.

The cylinder charge may be controlled by adjustment of a throttle of said engine inlet.

The cylinder charge may be determined by adjustment of the lift, and/or opening time, and/or closing time and/or opening duration of a respective inlet poppet valve.

The inlet poppet valve may be controlled via an active tappet.

In an aspect of the invention, the air charge for individual cylinders of a multi-cylinder engine is varied, for example by means of respective active tappets to achieve controlled imbalance in cylinder filling. This may provide comparatively rapid and smooth cessation of rotation.

Individual control of the charge of each cylinder can substantially eliminate oscillation of the crankshaft, so as to obviate the shudder associated with back rotation or 'rocking'.

Predictable cessation of rotation, for example at a repeatable crankshaft angle permits re-engagement of a starter motor without risk of pinion clash. Accordingly a COM event can be effected comparatively quickly. In particular it may be possible to eliminate a final portion of crankshaft rotation in order to remove a compression stroke which lacks the inertia to pass TDC; by this means the time for cessation of rotation of the engine may be reduced.

Individual cylinder control also permits a cylinder on an induction or compression stroke to have a comparatively full air charge at the time of cessation of rotation, thus ensuring good re-start performance as compared with a cylinder which is less well filled due to closure of a throttle at the manifold inlet.

Controlled cylinder imbalance, leading to predetermined crankshaft position at cessation of rotation, also permits an optimum charge to be retained in a full cylinder, with low leakage. Accordingly an engine stopped period may be longer whilst retaining good re-start performance.

Emissions may also be better controlled by ensuring that the first cylinder to fire upon a restart command is appropriately charged, and positioned to ensure substantially complete combustion upon admission of fuel.

In an aspect of the invention there is provided a method of ceasing rotation of a four stroke internal combustion engine, comprising:
  ceasing fuel supply;
  controlling the cylinder charge from the engine inlet such that:
  a cylinder predicted to stop on a power stroke has a reduced air charge on the respective inlet stroke relative to the air charge on the respective inlet stroke of a second cylinder that is not predicted to stop on a power stroke.

In an embodiment the second cylinder may be a cylinder predicted to stop on a compression stroke. Accordingly, the cylinder predicted to stop on a power stroke may have a reduced charge, and the cylinder predicted to stop on a power stroke may have a comparatively full charge.

In an aspect of the invention there is provided a method of operating an internal combustion engine, said engine having an inlet manifold with a variable throttle, two or more combustion chambers, and one or more valves associated with each of said chambers, one or more of said valves being provided with an active tappet for modulating or controlling a lift characteristic of the valve, the method comprising:
  a) substantially ceasing a supply of fuel to the combustion chambers; and
  b) controlling an active tappet and thereby the valve associated therewith to manage air charges in the respective combustion chamber so as to effect a rapid slowdown in rotational motion of the engine.

In an aspect of the invention there is provided a method of operating an internal combustion engine, said engine having an inlet manifold with a variable throttle, two or more combustion chambers, and one or more valves associated with each of said chambers, one or more of said valves being provided with an active tappet for modulating or controlling a lift characteristic of the valve, the method comprising:
  a) substantially ceasing a supply of fuel to the combustion chambers; and
  b) controlling an active tappet and thereby the valve associated therewith to manage air charges in the respective combustion chamber so as to minimise or reduce irregular rotational movement of the engine as it slows and/or comes to a stop.

As the engine approaches cessation of rotation, the method may comprise an increase in the opening of said throttle, for example if air pressure in said manifold is below atmospheric pressure, and cylinder filling would be compromised. Conversely, in some circumstances, it may be advantageous to move the throttle in a closing direction, so as to reduce cylinder compression pressure in a diesel engine to ensure a smooth engine stop whilst maintaining sufficient cylinder filling for a prompt re-start.

In an aspect of the invention there is provided a method of operating an internal combustion engine, said engine having an inlet manifold with a variable throttle, two or more combustion chambers, and one or more valves associated with each of said chambers, one or more of said valves being provided with an active tappet for modulating or controlling a lift characteristic of the valve, the method comprising:
  a) substantially ceasing a supply of fuel to the chambers; and
  b) controlling an active tappet and thereby the valve associated therewith to ensure that a combustion chamber is provided with a full air charge at the time engine motion ceases, so as to facilitate engine restart.

In this specification, by 'air charge' we mean an air charge of desired mass, and this aspect of the invention may for example increase the mass of air induced into the cylinder which ceases motion on the induction or compression stroke (up to the maximum potential or maximum available air charge). Accordingly, an air charge may be considered to be "full" if the mass of air induced into the cylinder is substantially equal to or greater than the mass of air that would be induced into the cylinder in an engine shutdown without adjustment of valve lift characteristics.

As the engine approaches cessation of rotation, the method may comprise an increase in the opening of said throttle, for example if air pressure in said manifold is below atmospheric pressure, and cylinder filling would be compromised. Conversely, in some circumstances, it may be advantageous to move the throttle in a closing direction, such as to reduce cylinder compression pressure in a diesel engine to ensure a smooth engine stop whilst maintaining sufficient cylinder filling for a prompt re-start.

In one embodiment the method comprises closing an inlet valve for the or each cylinder which will cease on an expansion (power) stroke, and opening an inlet valve for the or each cylinder which will cease on a compression stroke. The method may comprise opening an inlet valve for the or each cylinder which will cease on an intake stroke. By cease we mean that the piston within the cylinder will come to a stop, and the crankshaft will cease rotation.

In an aspect of the invention there is provided a method of operating an internal combustion engine, said engine having an inlet manifold with a variable throttle, two or more combustion chambers, and one or more valves associated with each of said chambers, one or more of said valves being provided with an active tappet for modulating or controlling a lift characteristic of the valve, the method comprising:

a) substantially ceasing a supply of fuel to the chambers;
b) controlling an active tappet and thereby the valve associated therewith to manage air charges to maximise engine deceleration in the early part of shutdown, and;
c) controlling said active tappet to manage air charges in the latter part of shutdown so as to reduce or minimise engine shake.

As the engine approaches cessation of rotation, the method may comprise an increase in the opening of said throttle, for example if air pressure in said manifold is below atmospheric pressure, and cylinder filling would be compromised. Conversely, in some circumstances, it may be advantageous to move the throttle in a closing direction, such as to reduce cylinder compression pressure in a diesel engine to ensure a smooth engine stop whilst maintaining sufficient cylinder filling for a prompt re-start.

In an aspect of the invention there is provided a method of operating an internal combustion engine during the shutdown of said engine, said engine having an inlet manifold with a variable throttle, two or more combustion chambers, and one or more valves associated with each of said chambers, one or more of said valves being provided with an active tappet for modulating or controlling a lift characteristic of the valve, the method comprising:

a) substantially ceasing a supply of fuel to the chambers at shutdown initiation; and
b) controlling an active tappet and thereby the valve associated therewith to provide full air charge from said manifold to a respective combustion chamber upon a restart demand.

As the engine approaches cessation of rotation, the method may comprise an increase in the opening of said throttle, for example if air pressure in said manifold is below atmospheric pressure, and cylinder filling would be compromised. Conversely, in some circumstances, it may be advantageous to move the throttle in a closing direction, such as to reduce cylinder compression pressure in a diesel engine to ensure a smooth engine stop whilst maintaining sufficient cylinder filling for a prompt re-start.

In embodiments of the invention, the or each valve may comprise a poppet valve or the like.

In an aspect of the invention there is provided a method of ceasing rotation of a four stroke internal combustion engine, comprising ceasing fuel supply; controlling the cylinder charge from the engine inlet such that a cylinder predicted to stop on a power stroke has a reduced charge on the preceding inlet stroke, and a cylinder predicted to stop on a compression stroke has a comparatively full charge on the preceding inlet stroke.

The cylinder charge may be controlled to provide a comparatively full charge to a cylinder stopping on a compression stroke.

The cylinder charge may be controlled by adjustment of lift and/or duration, and/or opening time and/or closing time of an inlet poppet valve of each respective cylinder.

The cylinder charge may be controlled by adjustment of a throttle of said engine inlet.

Embodiments of the invention provide for the ability to control the charge (mass) of air in one or more of the combustion chambers at various points in a combustion or stroke cycle whilst the engine is performing a shutdown. For example inlet valves of successive cylinders may be independently controlled to obtain a desirable shutdown characteristic. This provides that shutdown characteristics such as rapidity of shutdown, NVH, and state of readiness for restart, may be controlled.

In an embodiment, an engine has a stroke cycle including at least an induction and a compression stroke of a piston in a cylinder/combustion chamber, and is provided with an associated active tappet and a poppet valve. If the poppet valve being controlled is an inlet valve, then on an induction stroke, such as for example the first induction stroke of the combustion chamber, after engine shutdown initiates (and at which time fuel supply may have been cut off but the inlet manifold inlet throttle is open), the lift and/or opening time of the poppet valve may be increased so as to introduce a greater air charge into the cylinder. This air charge may be greater than that normally introduced into the combustion chamber when the engine is running. On the compression stroke therefore, the piston in the cylinder (combustion chamber) will experience greater resistance as it moves towards TDC. This may result in a large resistance to engine rotation, which may in turn cause the engine to cease rotation before reaching TDC on this cylinder. Accordingly, the control of the poppet valve, in this case an inlet valve, by means of the corresponding active tappet may in this manner contribute to a faster engine shutdown, or allow a faster response to COM.

It may be that this technique may be applied during the early part of a shutdown, in which the engine speed is still relatively high and any NVH impact may be least likely to be detected by an occupant of a vehicle.

In an embodiment, the poppet valve being controlled may be an outlet valve of a four-stroke engine cylinder. Engine shutdown may have been initiated and the fuel supply to the cylinder cut off. Accordingly, an exhaust stroke of the piston will not be required to exhaust combustion gases from the cylinder. The lift and/or lift opening time of the exhaust poppet valve may in this circumstance be decreased or even eliminated altogether such that the exhaust stroke becomes, in effect, an additional compression stroke for the cylinder. This results in an additional resistance to engine rotation and more rapid slowing of engine rotation. In this way the control of the outlet poppet valve by means of the active tappet may contribute to a faster engine shutdown.

It may be that this technique may be applied during the early part of a shutdown, in which the engine speed is still relatively high and any NVH impact may be least likely to be detected by an occupant of a vehicle.

In an embodiment, the poppet valve being controlled may be an outlet valve, and the engine may be a multi-cylinder engine. Engine shutdown may have initiated, with fuel supply having been cut off and the inlet manifold inlet throttle having been left open. A situation may arise in which a first piston in a first cylinder has just passed TDC and has a full compressed air charge, which is now acting to continue rotation of a crankshaft of the engine, whilst a second cylinder has a second piston at a post-BDC point and has a full air charge that continued rotation would act to compress. At this point the two pistons act in opposition to each other via the crankshaft, and as alluded to elsewhere herein, in the prior art this may actually result in a 'rocking' motion with the crankshaft rotationally 'bouncing' forwards and backwards until equilibrium between the two air-charged cylinders is reached.

Alternatively the engine rotation may slow as the second cylinder reaches TDC but then may increase again once the second cylinder passes TDC and the newly compressed air charge then also acts to rotate the crankshaft, resulting in an irregular or 'lumpy' rotation of the crankshaft during a particular range of rotation. In accordance with an aspect of the invention however, the outlet poppet valve on the second cylinder, whilst at the post-BDC point, may be controlled so as to lift and allow some of the air charge in the cylinder to pass to exhaust. This may prevent or moderate the rotational slowing or even a potential 'rebound' motion of the crankshaft.

In an embodiment the lift of the outlet poppet valve is finely controlled so as to allow a controlled outflow of air charge from the second, post-BDC cylinder and thus provide for 'damping' of the rotational motion of the crankshaft with concomitantly reduced irregular rotational motion. In an embodiment, such fine control of the outlet valve may be used to allow the coming to rest of the crankshaft in a 'damped' manner, with greatly reduced or even eliminated rebound characteristic. In effect some or all of the energy of compression is released to the exhaust tract.

It may be that this technique may be applied in the later part of an engine shutdown when the engine speed is relatively low, or engine stop is imminent, and when NVH impact, in the prior art, tends to be greatest.

In an embodiment, in the situation where the engine crankshaft is about to stop rotating and 'bouncing' may be about to occur due to contrarily opposed pressurised air charges in first and second cylinders, any inlet or outlet valve on the first cylinder may be lifted in a controlled manner by a related active tappet to reduce pressure in the first cylinder and 'damp' the motion of the engine.

It will be understood that any reference to, for example, a first piston and a second piston is illustrative and a plurality of pistons may be controlled in this manner, or the action of a plurality of pistons in an engine may be controlled analogously as described herein.

In an embodiment, the poppet valve being controlled may be an inlet valve. Engine shutdown may have initiated, with fuel supply having been cut off and the inlet manifold inlet throttle having been left open. As in prior art embodiments, the inlet manifold pressure is maintained and full air pressure charges may enter the cylinders as the engine continues to rotate. However, as previously discussed, this can result in an irregular, 'lumpy' shutdown characteristic, particularly during the last part of shutdown where rotation speed is lowest and/or engine stop is imminent. In an embodiment, the inlet valve may have its inlet cycle altered by reduced lift or reduced lift time so that smaller charges of air enter the cylinder on the inlet stroke. The air charges allowed into the cylinder may in this way be reduced or may be eliminated. This means that the effect on an individual cylinder is the same or more similar to that as in a 'closed throttle' shutdown, in that smaller air charges are able to enter the cylinder. The effect may in fact be exaggerated by this use of the active valve control. However, the pressure in the inlet manifold is maintained during shutdown, so that on restart, a good restart characteristic is possible. In this way the use of active tappets allows for a shutdown with good NVH characteristics as in a prior art 'closed throttle' shutdown, whilst also allowing a good restart characteristic as allowed by a prior art 'open throttle' shutdown, as full pressure is maintained in the inlet manifold.

This also has advantages in a 'Change of Mind' (COM) event, where an engine restart is desired or demanded by a driver or some automatic system within a vehicle, during shutdown of the engine. This may occur, for example, when a 'stop-start' system begins a cycle upon a vehicle coming to rest. For example, a car may pull up at a junction and stop; the 'stop-start' system will identify the stopped state of the vehicle and take the opportunity to stop the engine. However, at the time the engine is shutting down, the driver sees a gap in traffic and initiates a torque demand on the engine. The engine is then required to restart at a time when it is shutting down. In prior art situations, the restart may not be optimum, particularly in a situation where a manifold throttle is closed and manifold pressure, and therefore pressure available to put air charges into the engine, is low—the throttle having been closed to give a shutdown with good NVH characteristics. The pressure needs to build back up again. In the present invention, where the manifold throttle is opened for the shutdown, the manifold pressure is maintained—individual valve control, on an event-by-event and on a 'per cylinder' basis, using an active tappet system, is used to minimise air charges into the engine during the shutdown. Accordingly, upon a COM event, there is no time lag in waiting for manifold pressure to rebuild—high mass air charges can be introduced into the very next cylinder intake stroke by a suitable inlet valve lift and/or opening time, and restart characteristics are accordingly substantially improved, resulting in a quicker time to net torque production and, in the case outlined above where a driver is requesting torque in order to leave a junction, a more rapid 'getaway' from the junction. It will be appreciated that a COM event may occur due to torque demand from other systems in a vehicle, such as, for example, an air conditioning unit or other system in the vehicle that requires torque or power.

In an embodiment, aspects of the invention may be combined. A technique as described in one aspect or embodiment, where inlet valve lift and/or timing is increased so as to introduce larger air charges into at least one cylinder and thus increase torque drag on an engine, may be introduced in an early part of an engine shutdown until a predetermined engine rotation speed is reached. At this point an alternative technique as described in another aspect or embodiment may be used, such as lift and/or opening time of the inlet valve being reduced so as to introduce smaller air charges into the cylinder. As will be appreciated, this combination of techniques will result in an engine shutdown that has the positive effect of a prior art 'throttle open' shutdown (faster reduction of revs) in the early part of shutdown, although actually improved in that it may be even quicker than the prior art, and also the positive effect of a prior art 'closed throttle' shutdown in the latter part of shutdown—for example good NVH characteristics—whilst still retaining the full manifold pressure that is advantageous for a good restart.

Aspects and/or embodiments of the invention may be applied to a multi-cylinder engine in which at least one of two or more valves of each combustion chamber are individually controlled for each successive phase or stroke of a two-or-four stroke combustion cycle. Such valves may be inlet valves or outlet (exhaust) valves.

In embodiments, there may be a controller, such as an engine ECU, which is able to control any or all active tappets (and therefore valves) of any or all cylinders of an engine, such engine typically having four or more cylinders. This may implement any of the methods of the invention. There may be provided a sensor or sensors for determining the exact pressure of any cylinder in the engine at any point in time. A pressure sensor may be provided in each cylinder. Alternatively pressure estimation may comprise a mathematical model derived from measurements taken at other points within or of other characteristics of an engine (for example inlet manifold pressure, engine temperature, engine speed, engine torque, or look-up tables or similarly recorded engine characteristics to which the controller is able to refer). Such a controller may provide for the use of any method, aspect or embodiment of the invention in any particular cylinder at any point in a shutdown cycle so as to optimize any shutdown characteristic of the engine such as speed of shutdown, minimisation of NVH, preparedness for rapid restart, or any combination of same. Use of any particular method of valve control at a particular time may be in response to the known or calculated pressures in any or all cylinders that the controller may be able to reference or influence. The controller may also be configured to reference such further factors as ambient pressure and temperature, or any torque load to which the engine is subject, in determining the exact frequency and timing of any valve lift variation in accordance with any method aspect of the invention in order to perform an engine shutdown which is optimised for a stop/start cycle.

The controller may be included in a vehicle. The controller may take the form of a specific module, system or program or may be part of a larger module, system or program, which may be part of a vehicle.

It will be understood that individual characteristics of a particular engine will influence application of the invention according to the kind of engine and the desired result. Thus, for example the timing of use of a variable throttle within an inlet manifold may depend upon whether the engine is a gasoline or diesel engine; whether the engine is operating in a traditional Otto or Diesel cycle, or a modification thereof, such as an Atkinson cycle; the number of cylinders of the engine; the inherent stopping characteristics thereof; and the inherent starting characteristics thereof.

The invention permits turning of a stopping command to the intent that rotation is ceased in a rapid and smooth manner and/or that one or more cylinders has a full air charge capable of achieving a rapid re-start of rotation. Selection of optimum characteristics for smooth shutdown and prompt re-start may require opening or closing of the throttle according to the required level of refinement for a particular engine or vehicle.

Aspects of the invention provide for a predictable engine shutdown with the absence of shake or shudder, as in the minimum achievable time; rock back or reverse rotation may be substantially eliminated.

In case of a COM event, a starter motor may be activated without risk of pinion clash.

Aspects of the invention allow for the stopping position of a multi-cylinder engine to be selected for optimum restart, in which the cylinders ceasing rotation on the induction or compression strokes have a high air charge. Aspects of the invention also provide for rapid and consistent response to a COM request (prior to cessation of rotation). The high air charge may be maintained for a significant period by control of active inlet valves. A high air charge may be used to achieve engine restart by reinstating fuel and ignition, but without starter motor intervention.

By better control of engine rotation in a stopping phase, fuel injection can be optimized for restart to ensure low emissions, in particular emissions of unburnt fuel.

In another aspect of the invention for which protection is sought there is provided a method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:

a) ceasing a supply of fuel to the chambers;
b) substantially opening the manifold throttle;
c) controlling the active tappet and thereby the at least one said poppet valve to manage air charges in at least one combustion chamber so as to effect a rapid slowdown in rotational motion of the engine.

In an embodiment, the air charge management may comprise a maximisation of air charge inlet to the chamber. Optionally, the air charge management may comprise a maximisation of air charge inlet to the chamber by increasing inlet valve opening time. Further optionally, the air charge management may comprise a maximisation of air charge inlet to the chamber by increasing inlet valve lift.

In an embodiment the air charge management may comprise a restriction of air charge outlet from the chamber. Optionally, the air charge management may comprise a restriction of air charge outlet from the chamber by decreasing outlet valve opening time. Further optionally the air charge management may comprise a restriction of air charge outlet from the chamber by decreasing outlet valve lift.

In another embodiment of the invention for which protection is sought there is provided a method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:

a) ceasing a supply of fuel to the chambers;
b) substantially opening manifold throttle;
c) controlling the active tappet and thereby the at least one said poppet valve to manage air charges in at least one combustion chamber so as to minimise irregular rotational movement of the engine as it slows or stops.

In an embodiment the air charge management may comprise a minimisation of air charge inlet into the chamber. Optionally, the air charge management may comprise a minimisation of air charge inlet into the chamber by decreasing inlet valve opening time. Further optionally the air charge management may comprise a minimisation of air charge inlet into the chamber by decreasing inlet valve lift.

In another embodiment the air charge management may comprise a maximisation of air charge outlet from the chamber. Optionally, the air charge management may comprise a maximisation of air charge outlet from the chamber by increasing outlet valve opening time. Further optionally, the air charge management may comprise a maximisation of air charge outlet from the chamber by increasing outlet valve lift.

In another aspect of the invention for which protection is sought there is provided a method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:

a) ceasing a supply of fuel to the chambers;
b) substantially opening the manifold throttle;
c) controlling the active tappet and thereby the at least one said poppet valve to ensure that at least one combustion chamber is provided with the maximum possible air charge at the time engine motion ceases.

In an embodiment the method may comprise increased inlet valve opening time on the final inlet stroke of the at least one combustion chamber.

In another embodiment the method may comprise increased inlet valve lift on the final inlet stroke of the at least one combustion chamber.

In a further embodiment the method may comprise reduced or zero outlet valve opening on the final upwards stroke of a piston associated with the chamber.

In an aspect of the invention for which protection is sought there is provided a method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:

a) ceasing a supply of fuel to the chambers;
b) substantially opening the manifold throttle;
c) controlling the active tappet and thereby the at least one said poppet valve to manage air charges to maximise engine deceleration in the early part of shutdown in accordance with a method of modulation of the shutdown of an internal combustion engine as described above, and;
d) controlling the active tappet and thereby the at least one said poppet valve to manage air charges in the latter part of shutdown so as to minimise engine shake in accordance with a method of modulation of the shutdown of an internal combustion engine as described above.

In an embodiment the method may further comprise the step of:

e) controlling the active tappet and thereby the at least one said poppet valve to maximise the final air charge as the engine comes to rest in accordance with claims 15 to 18.

In an aspect of the invention for which protection is sought there is provided a method of enabling restart of an internal combustion engine during the shutdown of said engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:

a) ceasing a supply of fuel to the chambers at shutdown initiation;
b) substantially opening the manifold throttle during shutdown;
c) controlling the active tappet and thereby the at least one said poppet valve to provide a maximum air charge from said manifold to at least one combustion chamber upon a restart demand.

In an aspect of the invention for which protection is sought there is provided a control unit, system, or program for an internal combustion engine, arranged to implement any of the methods described above.

In an aspect of the invention for which protection is sought there is provided an engine provided with a control unit, system or program as described above.

In an aspect of the invention for which protection is sought there is provided a vehicle provided with a control unit, a system, a program or an engine as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Methods in accordance with embodiments of the present invention are described herein with reference to the accompanying Figures.

Figure 1:
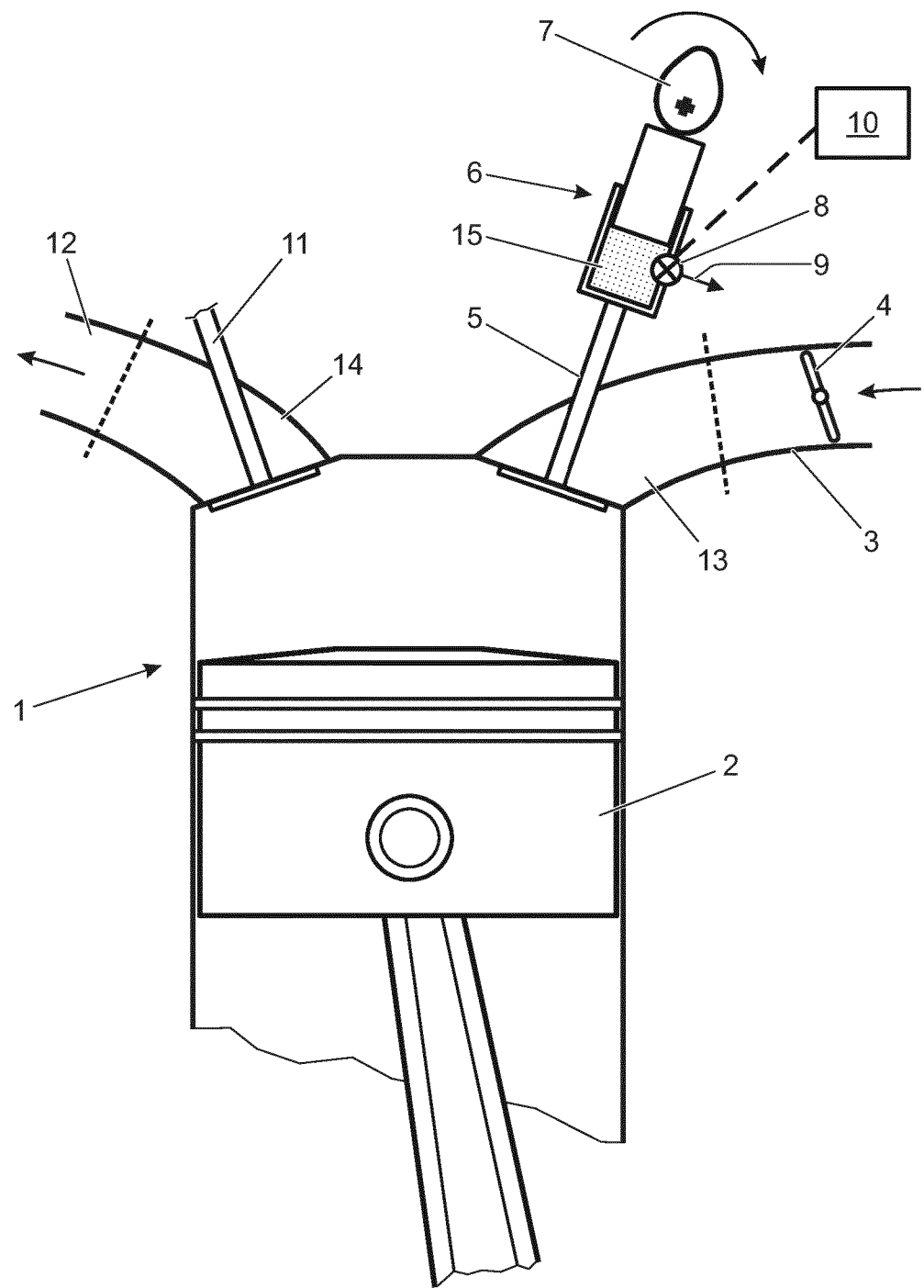
FIG. 1 shows a schematic diagram of a reciprocating piston of an internal combustion engine provided with inlet and outlet poppet valves and a cam for opening the inlet poppet valve, also a hydraulic tappet with a solenoid operated bleed valve for moderating the actuation of the input valve.

With reference to FIG. 1, there is a schematic illustration of elements of an internal combustion engine. A cylinder (1) is provided with a piston (2) which reciprocates within it, and space above the piston defines a combustion chamber which is provided with an inlet valve (5) and an outlet/exhaust valve (11). Air is introduced to the chamber via inlet port (13) by inlet manifold (3) which is provided with a throttle (4) in the form of a butterfly valve. Gases exit the chamber via outlet port (14) to exhaust manifold (12). Poppet valve (5) in the inlet port (13) is actuated principally by cam (7) rotating on a camshaft (not shown) and closed by a spring (not shown). Actuation of the valve (5) is moderated by active tappet (6) between the cam and the valve. Tappet (6) comprises a hydraulic chamber (15) which receives a constant supply of oil under pressure, and whose volume is determined according to control of a bleed valve (8) which allows escape of fluid as indicated by arrow (9). By variation of opening of the bleed valve, the instant volume of oil can be altered to affect the lift, duration and timing of the operation of the inlet valve. It will be understood that the active tappet may enhance, oppose or neutralise the operation of the inlet valve in response to the actuation proffered by the cam. It is emphasised that the kind of active tappet actually used in respect of the invention is not important, the present illustration being by way of example only. It is important that the tappet provided (of whatever type) should permit fast variation of valve lift on an event basis—it is envisaged that valve lift may therefore be varied at each successive opening thereof, if required, for each cylinder of a multi-cylinder engine. Command of the active tappet in this example is by an ECU (10).

In the present example, outlet valve (11) is also controlled by a similar arrangement, although the concomitant cam and tappet are not shown in this FIG. 1.

It should be noted that some kinds of active tappet operate only during active lifting of a poppet valve via a respective cam lobe, and accordingly the possibilities for variation of lift or variation of duration of valve opening is restricted accordingly.

In use, the admission of air into the engine is generally controlled via the throttle valve (4), which is in turn commanded by ECU (10) according to conventional control parameters such as accelerator pedal position, altitude, air temperature and the like. It will be understood that an alteration of the position of throttle valve (4) changes the rate of air inflow, but does not immediately influence the amount of air admitted to the combustion chamber due to the air volume contained in the inlet manifold 3 and inlet port 13.

Figure 2:
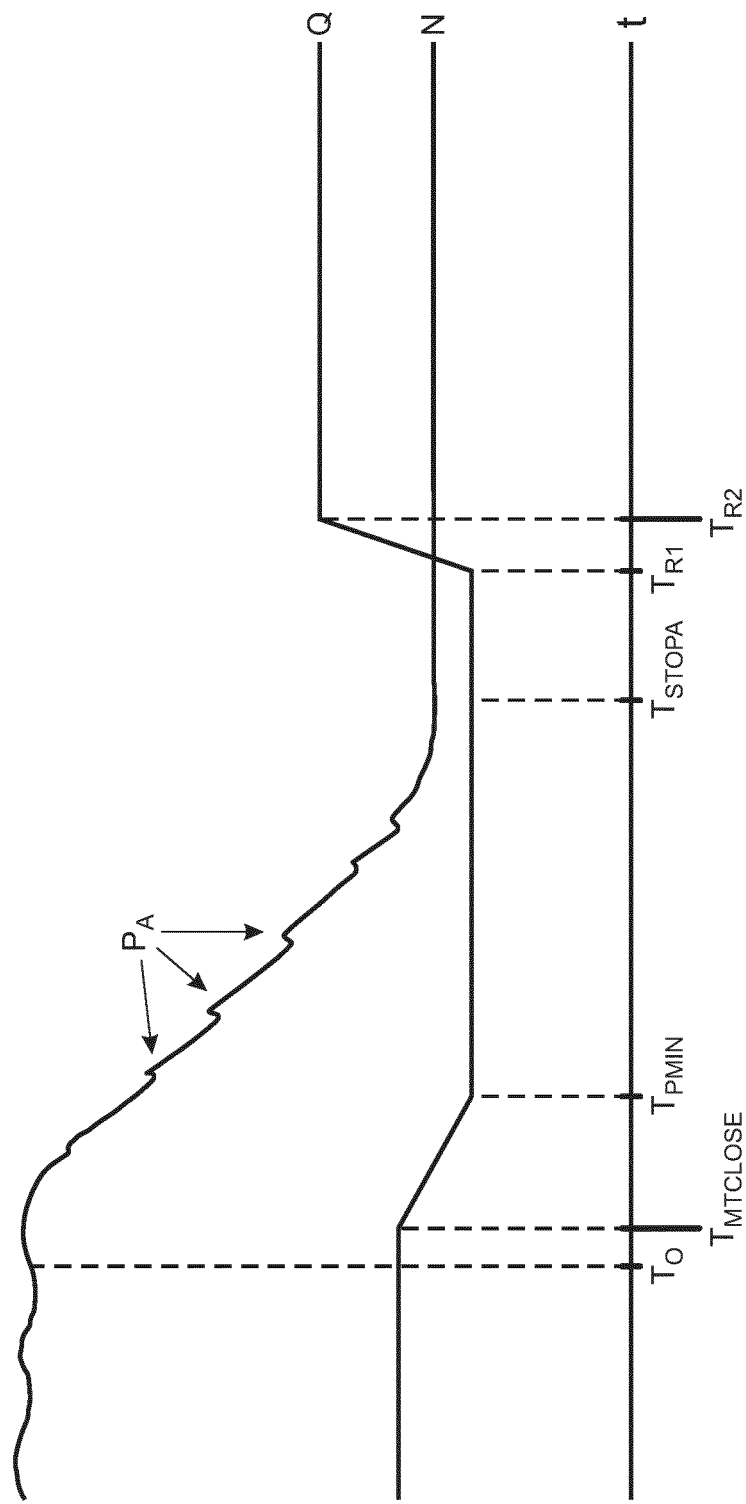
FIG. 2 shows a graphical representation of a shutdown characteristic of an engine in accordance with the prior art in which a manifold throttle is shut during an engine shutdown (Case A)

FIG. 2 illustrates a shutdown characteristic of an engine in accordance with the prior art where the throttle 4 is fully closed at time $T_{MTCLOSE}$ shortly after the beginning of an engine shutdown at time $T_0$. Traces of air charge (Q) and engine speed (N) are illustrated over time (t) It can be seen that air pressure in the manifold drops as time passes, to a minimum at time $T_{PMIN}$ by virtue of the result that air charges introduced into the cylinder combustion chamber drop concomitantly. This results in this example in a shutdown that is relatively extended to time $T_{STOPA}$ (see FIG. 3 for comparison), but which is relatively smooth, with relatively small perturbations $P_A$ in momentary engine speed during the time in which the overall engine speed is dropping towards zero at $T_{STOPA}$. It will also be appreciated that, due to the lower air pressure in the manifold during both the majority of the engine shutdown and after engine shutdown, a request to re-start the engine will take longer to fulfil. What is known as a 'change of mind' restart, where an engine is stopping in accordance with a 'stop-start' routine, and a driver or vehicle system commands a torque increase during the period when the engine is stopping, is generally made difficult or impossible in this type of shutdown, as there is a finite time period (illustrated after engine stop $T_{STOPA}$ by time period $T_{R1}$-$T_{R2}$ in the present FIG. 2) during which air pressure in the manifold, and hence potential air charge pressure and magnitude, is recovered.

FIG. 2 illustrates a characteristic in which engine speed rundown is extended but relatively smooth. Engine shake is relatively low during stopping, but restart characteristics are not optimum due to low air charge at time $T_{R1}$. Change of mind re-start (COM) is compromised.

Figure 3:
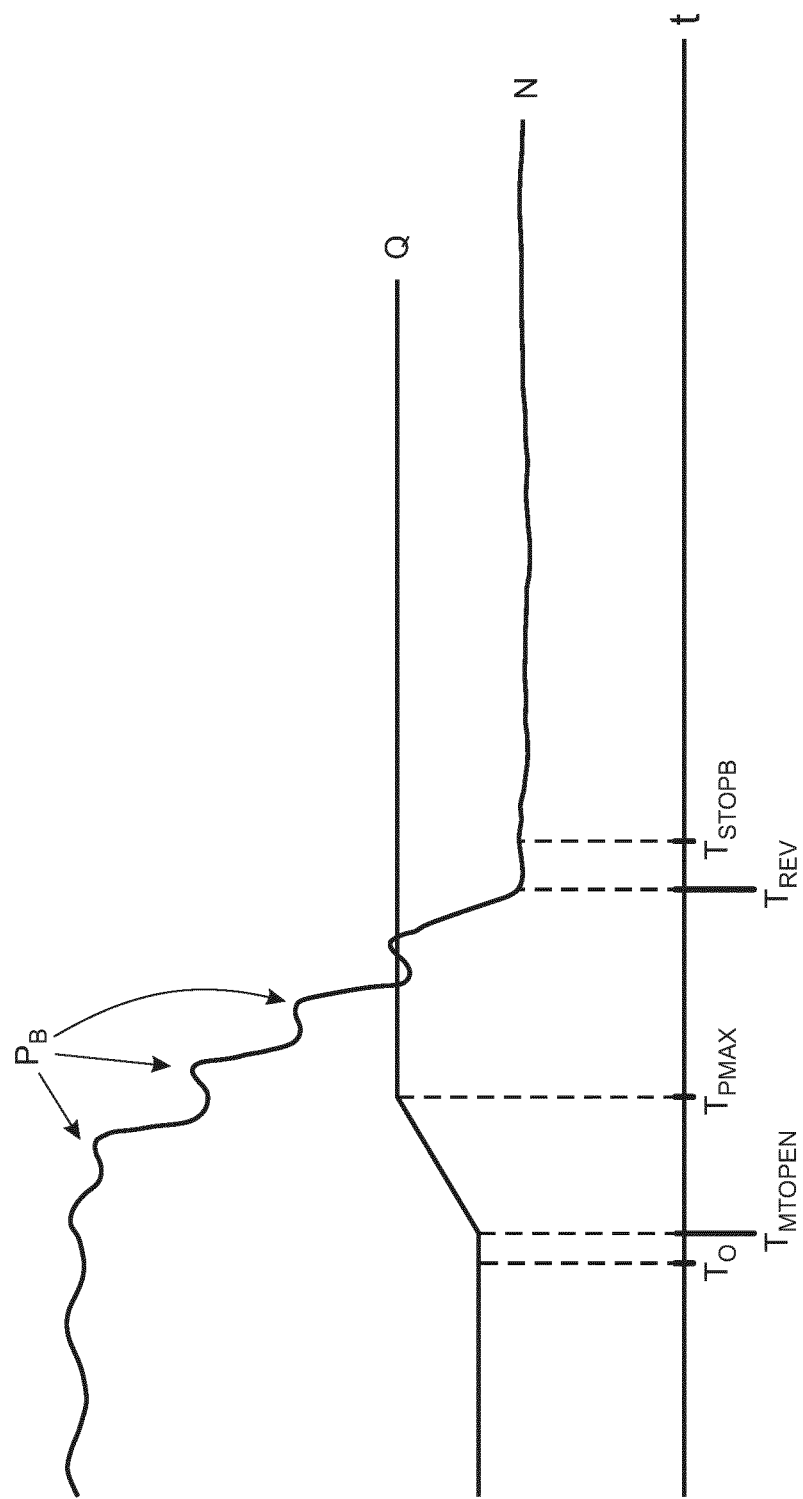
FIG. 3 shows a graphical representation of a shutdown characteristic of an engine in accordance with the prior art in which a manifold throttle is left open during an engine shutdown (Case B)

FIG. 3 illustrates a shutdown characteristic of an engine in accordance with the prior art where the throttle 4 is left open—possibly fully opened from a part-open position—during an engine shutdown, at time $T_{MTOPEN}$ such that manifold pressure maximises at time $T_{PMAX}$ and greater air pressure is available for higher pressure and/or larger air charges. The opening may in some cases require to be only slightly increased to achieve sufficient cylinder filling. Due to the work required to compress air charges in the cylinder combustion chamber and the other losses experienced by the engine in pumping greater masses of air through, it will be seen that in relation to FIG. 2, the shutdown to time $T_{STOPB}$ is relatively quicker. However, due to the resistances of the air charges in the cylinder to compression, it will be seen that momentary perturbations $P_B$ in engine speed are relatively large, and this tends to exhibit as vibration and/or shake which may be felt by vehicle passengers, or which will require significant masses of vibration damping and similar materials to prevent communication of the NVH to such passengers. In particular just before the point at which the engine comes to a total stop, at time $T_{REV}$, there is in this example a moment in which engine rotation is reversed as a compressed air charge forces the piston in at least one cylinder downwards before TDC is reached. It will be appreciated that this is likely to be the case where at least one cylinder, in a multi-cylinder 4-stroke engine, is on its compressive stroke at the point where engine speed is approaching, or reaches, zero. In contrast to the negative NVH effects of this kind of shutdown, however, it will be seen that as well as having the potential to be quick, the fact that manifold pressure is maintained during the shutdown (due to the throttle remaining open) means that air charges are likewise higher, and a re-start after engine shutdown is relatively good, and/or a 'change-of-mind' restart during a 'stop-start' cycle is much more expedited.

Thus in FIG. 3 engine rundown is quicker, engine shake is more pronounced, restart capability is good, but momentary engine reversal is possible; COM capability is relatively good.

Figure 4:
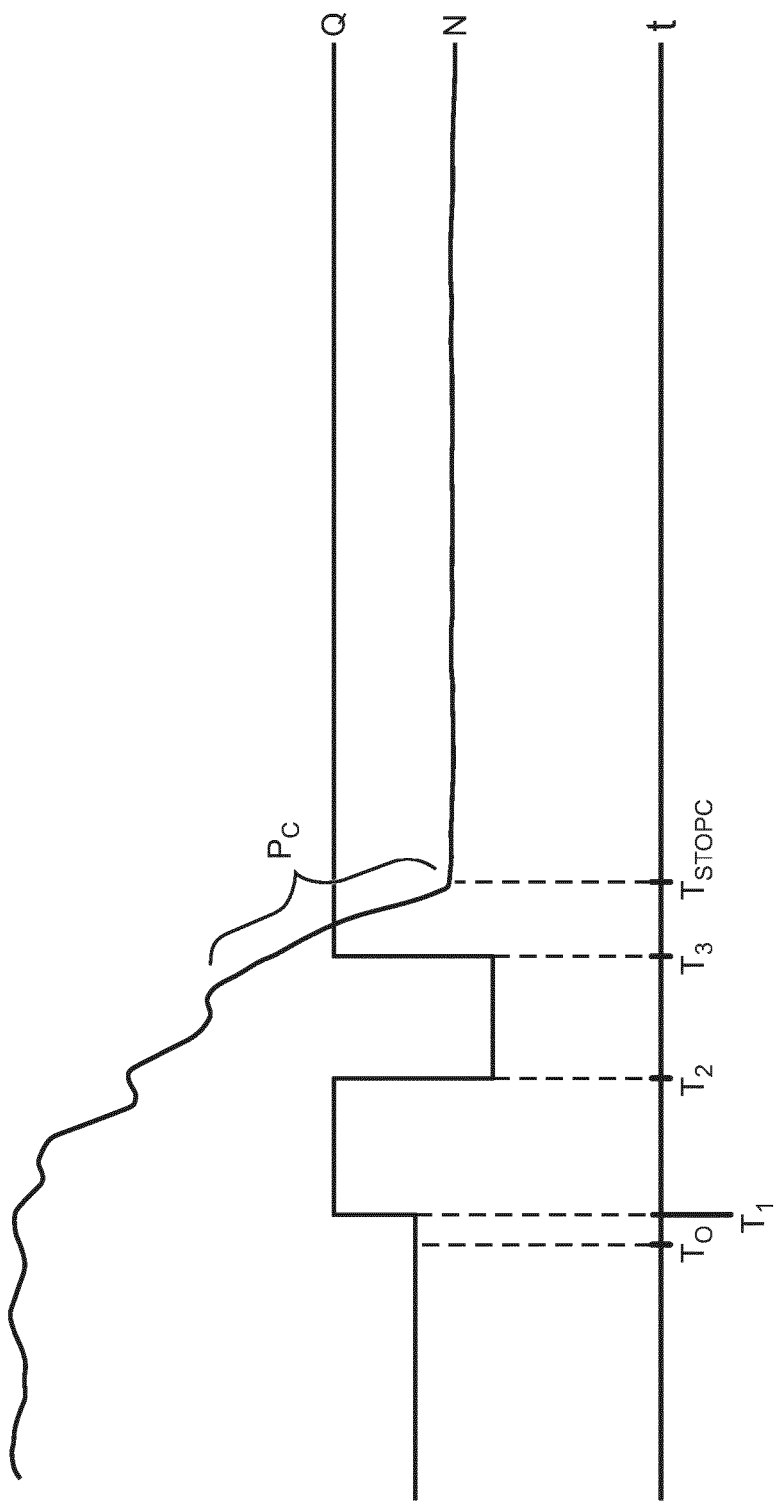
FIG. 4 shows a graphical representation of a shutdown characteristic of an engine in accordance with an embodiment of the present invention wherein the manifold throttle is left open during shutdown, air charges are increased by CVVL activation in the early part of shutdown, air charges are decreased by CVVL activation during the latter part of shutdown, and the final air charge as the engine stops is maximised by CVVL usage (Case C)

FIG. 4 illustrates an engine shutdown in accordance with aspects and embodiments of the invention. At the beginning of shutdown $T_0$, the manifold throttle is fully opened so as to maximise available manifold pressure $T_{MTOPEN}$. The engine may be being throttled by the inlet valves. For the first part of the subsequent shutdown during time $T_1$-$T_2$, air charges into the cylinder are maximised by individual valve control in accordance with aspects and embodiments of the invention, by means such as for example maximisation of inlet valve lift and/or maximisation of inlet valve opening time. Alternatively, minimisation of outlet valve lift and/or maximisation of outlet valve opening time may be adjusted if a similar effect can be achieved having regard to the engine under consideration. As an alternative, any combination of the preceding techniques may be utilised. In this way, the engine speed is reduced as quickly as possible during this period of shutdown. In effect, shutdown in this period mirrors, or may be an exaggerated version of, an 'open throttle' shutdown as illustrated in FIG. 3.

For the second part of the shutdown during time $T_2$-$T_3$, air charges into the cylinder are reduced by valve management as per aspects/embodiments of the invention by means such as inlet valve lift, or inlet valve opening time, reduction. Alternatively, outlet valve opening time or lift may be increased. In this way, this part of engine shutdown tends towards the characteristics of a 'closed throttle' shutdown as illustrated in FIG. 2—NVH characteristics are greatly improved as engine speed reduction is relatively smooth with few perturbations after $T_2$, as indicated in FIG. 4 by $P_C$. However, in the final part of engine shutdown during time $T_3$-$T_{STOPC}$, immediately before engine stop, the last inlet stroke has, or the last two or three inlet strokes have, a maximised air charge so as to definitively and immediately bring the engine to a stop, having regard to engine characteristics and the risk of the energy of compression continuing to rotate the crankshaft upon an expansion stroke. A balancing of cylinders and fine control of valves may be employed as discussed elsewhere herein, and in this way engine 'bounce' is eliminated. Also, at least one cylinder is then provided with a maximum air charge, so if the engine is subsequently subject to a restart request, it will be able to fulfil torque demand relatively quickly. It will be understood that the exact number of full air charge inlets will depend on engine characteristics such as number of cylinders, ability to 'balance' air charges, and so on.

In FIG. 4 the air charge is increased at the beginning of shutdown, but air charge is reduced as engine stop is approached. Air charge is subsequently increased to prevent piston reversal at engine stop. Subsequent restart and COM capability is good.

Figure 5:
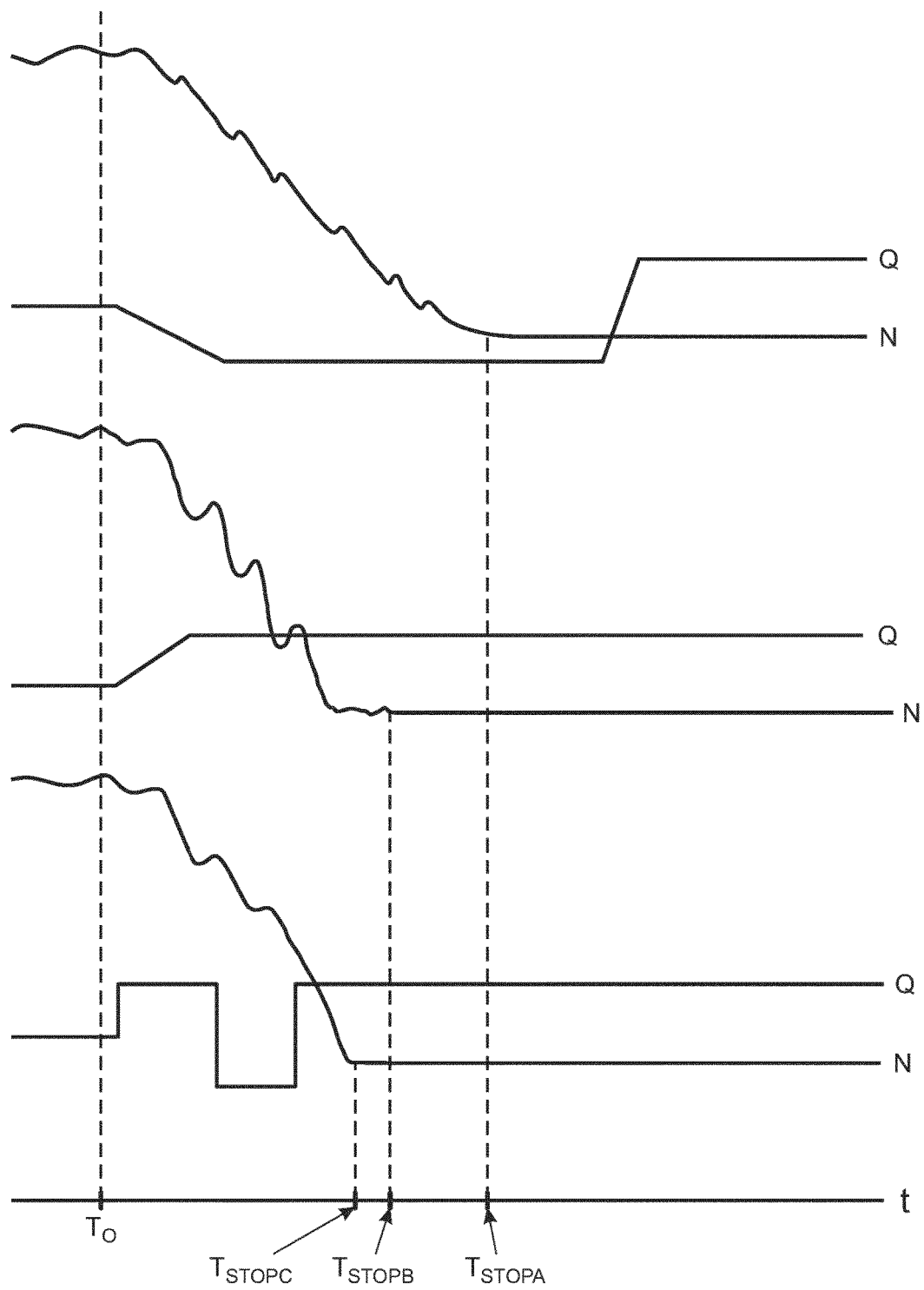
FIG. 5 shows a graphical representation of the shutdown characteristics of an engine in accordance with the conditions of each of the FIGS. 2 to 4, on a common scale, for comparative purposes.

FIG. 5 shows the graphical representation of FIGS. 2 to 4 on a common grid scale so as to illustrate the stopping times in a relative fashion. It will be seen that in this example where a prior art 'closed throttle' shutdown occurs (FIG. 2), the time to stop ($T_{STOPA}$) is considerably longer than the time to stop in a FIG. 3 'open throttle' situation (to time $T_{STOPB}$). In the example shown in accordance with aspects of the invention, the time to stop ($T_{STOPC}$) is shorter again due to the methodology employed, where a 'fully open throttle' is employed and air charge management is effected by active valve control.

In one example of controlled stopping of a four stroke, four cylinder i.c. engine, the ECU determines which piston will stop on a power (expansion) stroke, and closes the or each inlet valve associated therewith for the immediately preceding intake stroke, so as to ensure slowing of the engine without risk of reverse rotation or 'rocking'. As this cylinder progresses from intake via a compression stroke to the expansion stroke, two other cylinders perform an intake stroke, so that when the engine ceases rotation, one cylinder is on the compression stroke, and one cylinder is on the intake stroke. For these latter cylinders, the respective inlet valves are controlled to ensure a full air charge for good re-start capability—in other words the respective inlet valves are open to substantially the maximum extent required, being a suitable setting of timing, lift and duration. If necessary the position of the variable throttle valve is adjusted to ensure that filling of the re-start cylinders is not compromised. The throttle valve moved in the opening direction to avoid an unwanted restriction on filling of the re-start cylinders. In some circumstances it may be possible to move the throttle valve in a closing direction to obtain a smoother and/or faster cessation of rotation, whilst not compromising filling of the re-start cylinders.

Thus in this aspect the invention is characterized by open inlet valves as cessation of rotation approaches, and a sequence of closed and open inlet valves in the final rotation of the crankshaft before stopping of a four cylinder engine. The same technique can be applied to engines having a different number of cylinders, to the intent that cessation of rotation is rapid during the final rotation, and those cylinders that will be first required for re-start are provided with a full air charge.

In the event of COM, injection of fuel into the cylinder which will stop on a compression stroke is fully effective, because that cylinder has a full air charge and is approaching TDC. Furthermore the next cylinder to fire (being the cylinder on an induction stroke) also has a full air charge.

Rapid cessation of rotation also minimizes the risk of starter motor clash, where 'rocking' must be allowed to cease before starter motor activation.

As noted above, where each cylinder has poppet valves operating according to a common cam profile, a stop command results in oscillation of the crankshaft as rotation ceases. This effect may be likened to an air spring in which the piston on a compression stroke has insufficient inertia to pass TDC, and is accordingly pushed back towards BDC.

Figure 6:
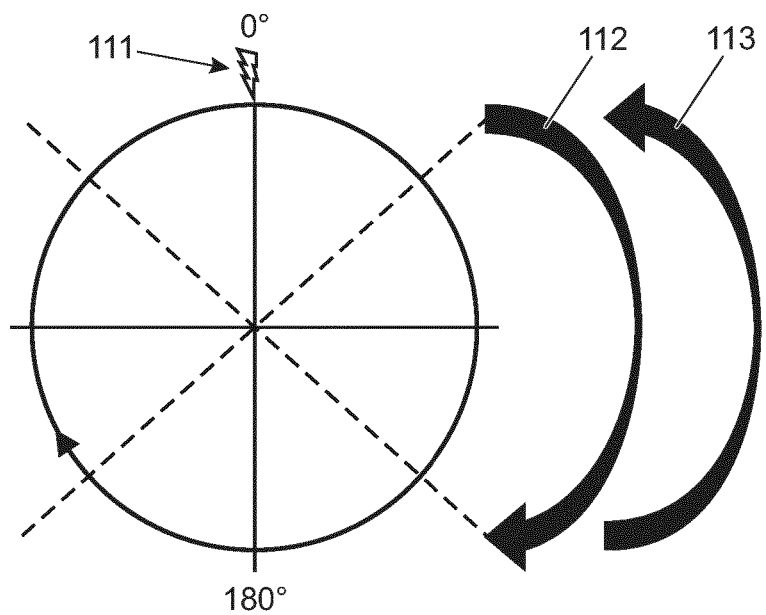
FIGS. 6 and 7 illustrate comparative diagrams of crankshaft rotation for cessation of rotation with conventional cylinder filling, and cylinder filling according to an aspect of the invention.

FIG. 6 illustrates a crankshaft rotation diagram 110 for clockwise rotation, in which compression of the charge is between 180° and 0°, and expansion is between 0° and 180°. Ignition is indicated by spark icon 111. Oscillation in the final cylinder on a compression stroke is indicated by arrows 112, 113.

In one embodiment the invention provides for closure or significant throttling of induction at the inlet valve of the cylinder which is predicted to stop on a power stroke, and opening of the inlet valve of the cylinder which is predicted to stop on a compression stroke. This imbalance provides one method of stopping without rocking in a four cylinder engine.

Figure 7:
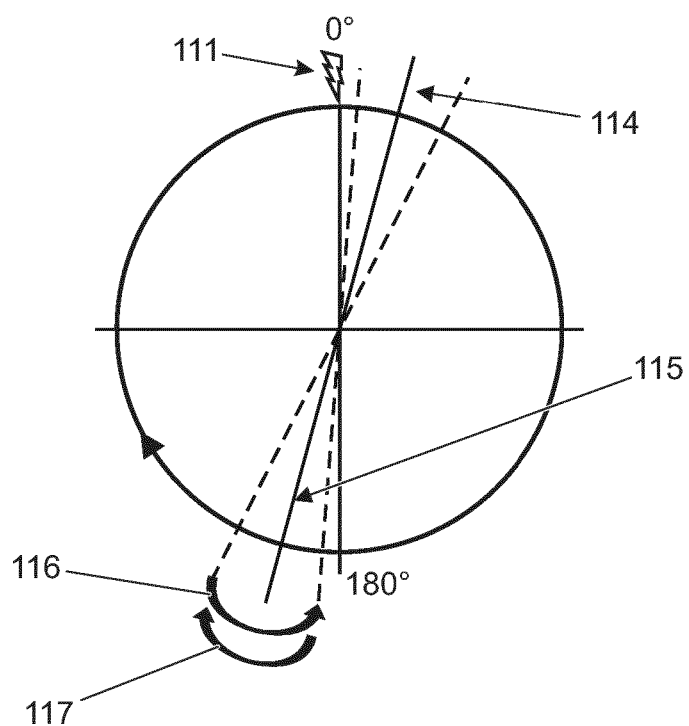

FIG. 7 illustrates the effect of the invention, in which poor filling of the cylinder on a power stroke 114, and good filling of the cylinder on a compression stroke 115 results in significantly reduced oscillation, as represented by arrows 116, 117.

Figure 8:
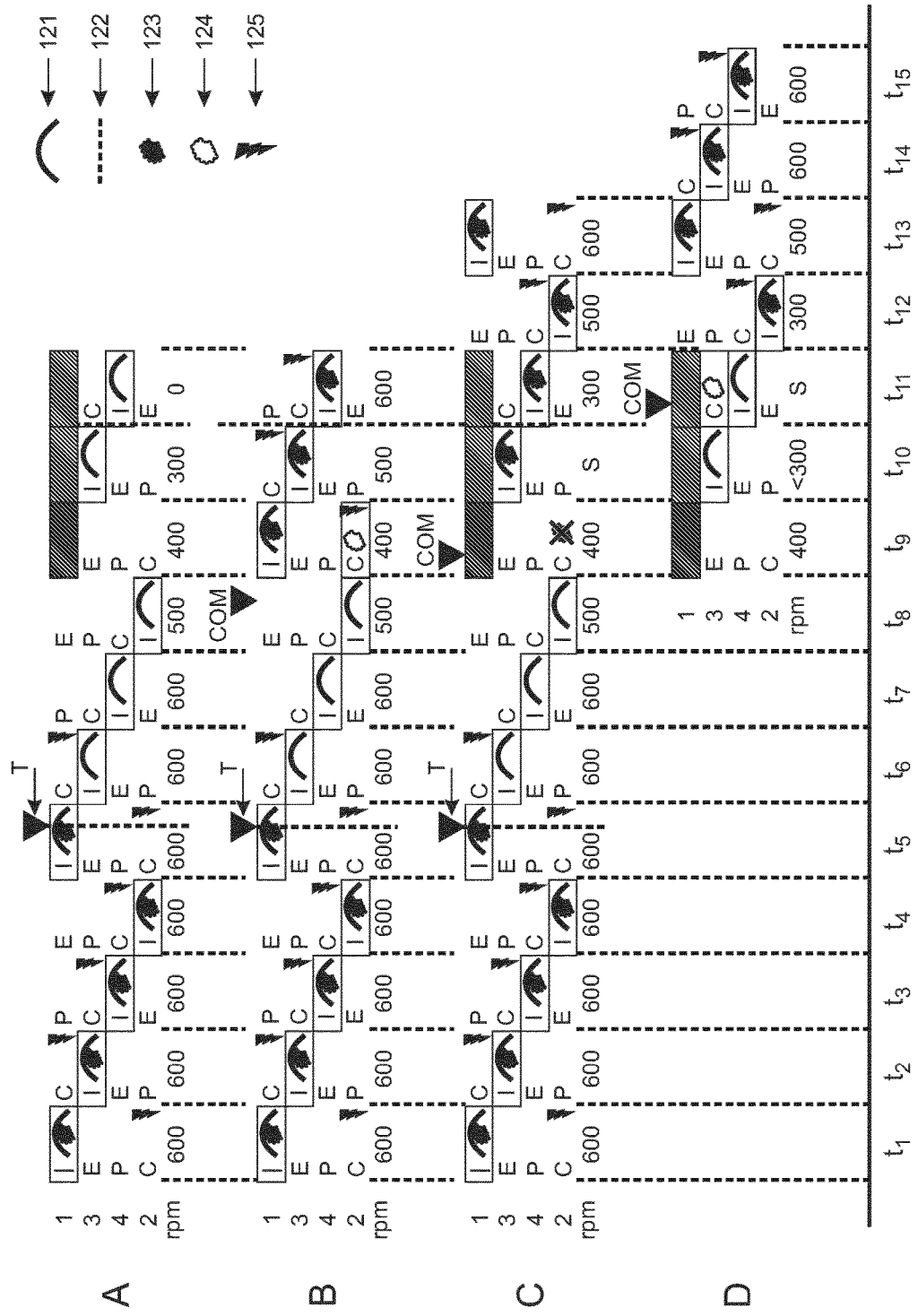
FIG. 8 illustrates comparative examples of cessation and re-start of rotation, according to an aspect of the invention, for different stop/start conditions.

FIG. 8 illustrates four exemplar stopping conditions for a four cylinder, in-line, four stroke gasoline engine having a firing order 1342, over successive equal time periods $t_1$-$t_{15}$. The four strokes are indicated by induction (I), compression (C), power (P) and exhaust (E).

In each diagram, symbols are provided to indicate inlet valve actuation 121, no inlet valve actuation 122, fuel injection 123, late fuel injection 124, and ignition spark 125.

Diagram A illustrates an engine stopping event from an idle speed of 600 rpm. In time periods $t_1$-$t_4$, normal four stroke operation is illustrated, with each cylinder firing once.

At time T, during time period $t_5$, a stop command is made, for example for a stop/start event in city driving. Fuel injection ceases in time period $t_6$ and ignition spark ceases in period $t_7$. In time period $t_8$ engine speed has fallen to 500 rpm. The inlet valve is actuated during period $t_6$-$t_8$ to allow cylinder filling, but not actuated in period $t_9$. Engine speed continues to fall. The inlet valve is actuated in periods $t_{10}$ and $t_{11}$ to again allow cylinder filling, and the engine stops during time period $t_{11}$.

Imbalance of cylinder filing, due to non-actuation of the inlet valve in time period $t_9$ allows cessation of rotation without substantial rocking. Inlet valve actuation in periods $t_{10}$ and $t_{11}$ ensures that the cylinders on induction and compression have a substantially full charge to facilitate good re-starting characteristics.

Diagram B is identical to diagram A for time periods $t_1$-$t_7$. During time period $t_9$ there is a change of mind (COM) command requiring the engine to again produce torque. Accordingly in period $t_9$ the inlet valve is actuated and fuel is injected on the induction stroke. Furthermore a late fuel injection is made in period $t_9$ for the cylinder on a compression stroke and ignition is also reinstated so that in period $t_{10}$ engine speed has risen to 500 rpm. Normal engine operation is resumed and in period $t_{11}$ the engine reaches normal idle speed of 600 rpm.

Diagram B shows the effect of a COM command before period $t_9$, during which in Diagram A cylinder 1 inlet valve is not actuated.

Diagram C shows the effect of a COM command during period $t_9$, when the engine is reducing speed and there is neither a normal nor a late injection of fuel. In this case the starter motor S is actuated in period $t_{10}$ along with immediate inlet valve actuation and fuel injection for the cylinder on an induction stroke. Thus in period $t_{11}$ the same cylinder is on a compression stroke and can respond to an ignition spark to produce power. Normal operation is resumed, and engine speed rises to 600 rpm in time period $t_{13}$.

Diagram D shows the effect of re-start command or very late COM after slowing of rotation in time period $t_{10}$. In period $t_{11}$ the starter motor S is actuated along with a late fuel injection and spark ignition in the cylinder on a compression stroke, and resumption of inlet valve operation and fuel injection for the cylinder on an induction stroke. Normal engine operation is resumed so that by period $t_{14}$ the normal idle speed of 600 rpm is regained.

FIG. 8 illustrates one mode of operation according to the invention, showing both imbalance of cylinder filling and the effect of COM at different timing. The principles of operation can be extended to other engine configurations, in particular engines having more cylinders in order to achieve rapid cessation of rotation without rocking, and good re-start performance due to good cylinder filling of those cylinders predicted to stop on the compression and induction strokes, and restricted cylinder filling on the cylinder(s) predicted to stop on the power stroke.

Aspects of the invention will be apparent from the following numbered paragraphs.

1. A method of ceasing rotation of a four stroke internal combustion engine, comprising:
   ceasing fuel supply;
   controlling the cylinder charge from the engine inlet such that:
   a cylinder predicted to stop on a power stroke has a reduced charge on the respective inlet stroke, and
   a cylinder predicted to stop on a compression stroke has a comparatively full charge on the respective inlet stroke.
2. A method according to aspect 1 wherein said cylinder charge is controlled to provide a comparatively full charge to a cylinder stopping on an induction stroke.
3. A method according to aspect 1 wherein the cylinder charge is controlled by adjustment of lift and/or duration, and/or opening time and/or closing time of a poppet valve of each respective cylinder.
4. A method according to aspect 1 wherein the cylinder charge is controlled by adjustment of a throttle of said engine inlet.
5. A method according to aspect 1 wherein cylinder charge is determined by adjustment of the lift, and/or opening time, and/or closing time and/or opening duration of a respective inlet poppet valve.
6. A method according to aspect 5 wherein said inlet poppet valve is controlled via an active tappet.
7. A method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:
   a) ceasing a supply of fuel to the chambers;
   b) controlling the active tappet and thereby the at least one said poppet valve to ensure that at least one combustion chamber is provided with a full air charge at the time engine motion ceases.
8. A method as claimed in aspect 7 wherein the method comprises increased inlet valve opening time on the final inlet stroke of at least one combustion chamber.
9. A method as claimed in aspect 7 wherein the method comprises increased inlet valve opening time for the final compression stroke of at least one combustion chamber.
10. A method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:
    a) ceasing a supply of fuel to the chambers;
    b) controlling the active tappet and thereby the at least one said poppet valve to manage air charges to optimise engine deceleration in the early part of shutdown in accordance with claims 20 to 27, and;
    c) controlling the active tappet and thereby the at least one said poppet valve to manage air charges in the latter part of shutdown so as to minimise engine shake in accordance with claims 28 to 34.
11. A method as claimed in aspect 10 comprising the step of:
    d) controlling the active tappet and thereby the at least one said poppet valve to provide a full air charge as the engine comes to rest in accordance with claims 1 to 6.
12. A method according to aspect 10 wherein the method comprises adjusting the position of said throttle after a command to shutdown said engine, and before cessation of rotation thereof.
13. A method of enabling restart of an internal combustion engine during the shutdown of said engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:
    a) ceasing a supply of fuel to the chambers at shutdown initiation;
    b) controlling the active tappet and thereby the at least one said poppet valve to provide a high air charge from said manifold to at least one combustion chamber in preparation for a restart demand.
14. A method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:
    a) ceasing a supply of fuel to the chambers;
    b) controlling the active tappet and thereby the at least one said poppet valve to manage air charges in at least one combustion chamber so as to optimise slowdown in rotational motion of the engine.
15. A method as claimed in aspect 14 wherein the air charge management comprises a maximisation of air charge inlet to the chamber.
16. A method as claimed in aspect 15 wherein the air charge management comprises a maximisation of air charge inlet to the chamber by increasing inlet valve opening time.

17. A method as claimed in aspect 15 wherein the air charge management comprises a maximisation of air charge inlet to the chamber by increasing inlet valve lift.

18. A method of modulation of the shutdown of an internal combustion engine, said engine having an inlet manifold with a throttle, at least two combustion chambers, and at least one poppet valve associated with each of said chambers, at least one of said poppet valves being provided with an active tappet for modulating or controlling a lift characteristic of the valve, the method comprising:
a) ceasing a supply of fuel to the chambers;
b) controlling the active tappet and thereby the at least one said poppet valve to manage air charges in at least one combustion chamber so as to minimise irregular rotational movement of the engine as it slows or stops.

19. A control unit, system, or program for an internal combustion engine, arranged to implement the method of any of aspects 1-18.

20. A vehicle provided with the control unit, system or program of aspect 19.

The invention claimed is:
1. A method of ceasing rotation of a four stroke internal combustion engine, comprising:
ceasing fuel supply; and
controlling cylinder air charge from an engine inlet such that:
a cylinder predicted to stop on a power stroke is provided with a reduced air charge on a first inlet stroke occurring two strokes before the power stroke, the reduced air charge being reduced relative to an air charge provided on at least one different inlet stroke occurring before the first inlet stroke and after ceasing the fuel supply, and
a cylinder predicted to stop on a compression stroke is provided with a comparatively full air charge on a second inlet stroke occurring one stroke before the compression stroke, the comparatively full air charge being comparatively full relative to the reduced air charge provided to the cylinder predicted to stop on the power stroke;
wherein the cylinder air charge is controlled by adjustment of at least one of lift, duration, opening time, and closing time of a poppet valve of each respective cylinder, wherein at least one of the poppet valves of a cylinder of the respective cylinders in which the at least one different inlet stroke occurs, is open during at least a portion of said at least one different inlet stroke.

2. A method according to claim 1 wherein said cylinder air charge is controlled to provide a comparatively full air charge to a cylinder stopping on an induction stroke.

3. A method according to claim 1 wherein the cylinder air charge is controlled by adjustment of a throttle of said engine inlet.

4. The method as claimed in claim 1, wherein the at least one different inlet stroke occurs one stroke before the first inlet stroke.

5. A method according to claim 1 wherein said poppet valve is controlled via an active tappet.

6. The method as claimed in claim 5, wherein the active tappet is cam-actuated and hydraulically controlled to enable fast adjustment of valve lift.

7. A method as claimed in claim 1, wherein
the internal combustion engine is a gasoline engine, and the method comprises substantially opening a manifold throttle of said engine inlet of said engine; or
the internal combustion engine is a diesel engine, and wherein the method comprises moving a manifold throttle of said engine inlet of said engine in a closing direction.

8. A method of modulation of the shutdown of an internal combustion engine, said engine having at least two combustion chambers, and at least one poppet valve associated with each of said chambers, said poppet valves being provided respectively with an active tappet for modulating or controlling a lift characteristic of the valve, the method comprising:
a) ceasing a supply of fuel to the combustion chambers;
b) controlling the active tappet associated with a first combustion chamber of said combustion chambers and thereby the at least one of said poppet valves associated with said first combustion chamber to ensure that the first combustion chamber is provided with a full air charge at a time engine motion ceases; and
c) controlling the active tappet associated with a second of said combustion chambers and thereby at least one of the poppet valves associated with the second combustion chamber to ensure that the second combustion chamber is provided with a full air charge at the time engine motion ceases.

9. A method as claimed in claim 8, comprising increased inlet valve opening time or increased inlet valve lift, or a combination of increased valve opening time and increased inlet valve lift on a final inlet stroke of at least one of the combustion chambers.

10. A method as claimed in claim 8, comprising increased inlet valve opening time or increased inlet valve lift, or a combination of increased inlet valve opening time and increased inlet valve lift for a final compression stroke of at least one of the combustion chambers.

11. A method as claimed in claim 9, comprising reduced or zero outlet valve opening on a final upwards stroke of a piston associated with the first combustion chamber.

12. A method according to claim 8, comprising moving an inlet valve in a closing direction for a cylinder of the engine which will cease on an expansion stroke, and moving an inlet valve in an opening direction for a cylinder of the engine which will cease on a compression stroke.

13. A method according to claim 12, comprising opening an inlet valve for a cylinder of the engine which will cease on an intake stroke.

14. A method according to claim 8, wherein the engine further comprises an inlet manifold with a throttle and wherein the method comprises adjusting a position of said throttle after a command to shutdown said engine, and before cessation of rotation of said engine.

15. A method as claimed in claim 8, wherein
the internal combustion engine is a gasoline engine, and the method comprises substantially opening a manifold throttle of an engine inlet of said engine, or
the internal combustion engine is a diesel engine, and the method comprises moving a manifold throttle of an engine inlet of said engine in a closing direction.

16. A control unit for an internal combustion engine, wherein the control unit is configured to cause a method of ceasing rotation of a four stroke internal combustion engine to be performed, the method comprising:
ceasing fuel supply; and
controlling cylinder air charge from an engine inlet such that:
a cylinder predicted to stop on a power stroke is provided with a reduced air charge on a first inlet stroke occurring two strokes before the power stroke, the reduced air charge being relative to an air charge provided on at least one different inlet stroke occurring before the first inlet stroke and after ceasing the fuel supply; and a cylinder predicted to stop on a compression stroke is provided with a comparatively full air charge on a second inlet stroke occurring one stroke before the compression stroke, the comparatively full air charge being comparatively full relative to the reduced air charge provided to the cylinder predicted to stop on the power stroke;

wherein the cylinder air charge is controlled by adjustment of at least one of lift, duration, opening time, or closing time of a poppet valve of each respective cylinder, wherein at least one of the poppet valves of a cylinder of the respective cylinders in which the at least one different inlet stroke occurs, is open during at least a portion of said at least one different inlet stroke.

17. A control unit for an internal combustion engine, wherein the control unit is configured to cause a method of modulation of the shutdown of an internal combustion engine to be performed, said engine having at least two combustion chambers, and at least one poppet valve associated with each of said combustion chambers, said poppet valves being provided respectively with an active tappet for modulating or controlling a lift characteristic of the valve, the method comprising:
   a) ceasing a supply of fuel to the combustion chambers;
   b) controlling the active tappet associated with a first combustion chamber of said combustion chambers and thereby the at least one of said poppet valves associated with the first combustion chamber to ensure that the first combustion chamber is provided with a full air charge at the time engine motion ceases; and
   c) controlling the active tappet associated with a second combustion chamber of said combustion chambers and thereby at least one other of the poppet valves associated with the second combustion chamber to ensure that the second combustion chamber is provided with a full air charge at the time engine motion ceases.

18. A vehicle comprising the control unit as claimed in claim 16.

19. A method of enabling restart of an internal combustion engine during the shutdown of said engine, said engine having an inlet manifold with a throttle, at least two combustion chambers, and at least one poppet valve associated with each of said combustion chambers, said poppet valves being provided respectively with an active tappet for modulating or controlling a lift characteristic of the poppet valve, the method comprising:
   a) ceasing a supply of fuel to the combustion chambers at shutdown initiation;
   b) controlling the active tappet associated with a first combustion chamber of said combustion chambers and thereby the at least one of said poppet valves associated with the first combustion chamber to provide a high air charge from said inlet manifold to the first combustion chamber in preparation for a restart demand; and
   c) controlling the active tappet associated with a second combustion chamber of said combustion chambers and thereby at least one of said poppet valves associated with the second combustion chamber to provide a high air charge from said manifold to the second combustion chamber in preparation for a restart demand.

20. A method as claimed in claim 19, wherein
the internal combustion engine is a gasoline engine and the method comprises substantially opening the throttle of the inlet manifold of said engine; or
the internal combustion engine is a diesel engine and the method comprises moving said throttle of the inlet manifold of said engine in a closing direction.

* * * * *